(12) United States Patent
Xue

(10) Patent No.: US 7,525,604 B2
(45) Date of Patent: Apr. 28, 2009

(54) WINDOWS WITH ELECTRICALLY CONTROLLABLE TRANSMISSION AND REFLECTION

(75) Inventor: Jiuzhi Xue, Broomfield, CO (US)

(73) Assignee: Naxellent, LLC, Broomfield, CO (US)

( * ) Notice: Subject to any disclaimer, the term of this patent is extended or adjusted under 35 U.S.C. 154(b) by 326 days.

(21) Appl. No.: 11/376,276

(22) Filed: Mar. 15, 2006

(65) Prior Publication Data

US 2006/0274218 A1    Dec. 7, 2006

Related U.S. Application Data

(60) Provisional application No. 60/661,850, filed on Mar. 15, 2005.

(51) Int. Cl.
*G02F 1/1335* (2006.01)
(52) U.S. Cl. .............................. 349/16; 349/96; 349/33; 349/98
(58) Field of Classification Search ............... 349/96, 349/16, 177, 33, 98, 187, 129, 142, 138, 349/114, 113
See application file for complete search history.

(56) References Cited

U.S. PATENT DOCUMENTS

| | | | | |
|---|---|---|---|---|
| 5,686,979 | A | * | 11/1997 | Weber et al. .................. 349/96 |
| 5,940,150 | A | | 8/1999 | Faris et al. ..................... 349/16 |
| 6,577,360 | B1 | | 6/2003 | Akiyama et al. |
| 6,624,936 | B2 | | 9/2003 | Kotchick et al. |

OTHER PUBLICATIONS

Weber, Michael F., Stover, Carl A., Gilbert, Larry R., Nevitt, Timothy J., Ouderkirk, Andrew J., "Giant Birefringent Optics in Multilayer Polmer Mirrors", Science; Mar. 31, 2000, vol. 287, Issue 5462.
Mori, Hiroyuki; Itoh, Yoji; Nishiura, Yosuke; Nakamura, Taku; Shinagawa, Yukio; "Performance of a Novel Optical Compensation Film Based on negative Birefringence of Discotic Compound for Wide-Viewing-Angle Twisted nematic Liquid-Crystal Displays", Jpn. J. Appl. Phys. vol. 36 (1997) pp. 143-147, Part 1 No. 1A, Jan. 1997.
Saitoh, Yukito; Kimura, Shinichi; Kusafuka, Kaoru; Shimizu, Hidehisa; "Optimum Film Compensation of Viewing Angle of Contract in In-Plane-Switching-Mode Liquid Crystal Display", Jpn. J. Appl. Phys. vol. 37 (1998) pp. 4822-4828 Part 1 No. 9A Sep. 1998.
Auton, J.P., "Infrared Transmission Polarizers by Photolithography", Applied Optics, Jun. 1967, vol. 6, No. 6, pp. 1023-1027.
DeVries, HL., Physical Laboratory of the University of Groningen, Netherlands "Rotatory Power and Other Optical Properties of Certain Liquid Crystals", Acta Cryst. (1951) pp. 219-226.

* cited by examiner

*Primary Examiner*—Thoi V Duong
(74) *Attorney, Agent, or Firm*—Robert G. Crouch; Bobby B. Soltani; Marsh Fischmann & Breyfogle, LLP

(57) ABSTRACT

A window having electrically controllable transmission and reflection includes a layer of liquid crystal material and polarizers on either side thereof. Different combinations of absorptive and reflective polarizers are disclosed. These different combinations can be used in different applications to achieve the desired results. Transparent, conductive layers are provided to apply an electrical field to the liquid crystal material so as to selectively control the rotation of the polarization of light passing therethrough.

15 Claims, 15 Drawing Sheets

Exemplary window 20

Optically active state, liquid crystal is in a twisted state when applied voltage is zero, and the polarization of the light will be rotated Optically inactive state, liquid crystal is driven to a vertically aligned state, and no rotation of polarization of light.

WINDOWS WITH ELECTRICALLY CONTROLLABLE TRANSMISSION AND REFLECTION

CROSS-REFERENCE TO RELATED APPLICATIONS

This application claims priority from U.S. Provisional Patent Application No. 60/661,850, entitled "Windows with Electrically Controllable Reflection," filed on Mar. 15, 2005, the contents of which are incorporated herein by reference.

BACKGROUND

Windows that can transmit a controllable fraction of incident light intensity would be beneficial in a variety of applications. Thus, windows of buildings or vehicles, windows between rooms, and personal items such as glasses or goggles are often used in situations in which it would be advantageous if their optical transparency could be adjusted, for example by electrical means.

Great efforts have been expended to improve the ways and means of selectively controlling the transmission of light through window structures. A common approach to light control involves using an opaque window shade to reduce the transmission of electromagnetic radiation. Such shades may either be purely mechanical (the most common type) or may be controlled by a motor. Another approach to variable control of light transmission can be achieved by mechanically rotating a pair of polarizing films where the relative angle between polarizing axes of the polarizing films are changed.

Another approach to light control involves the use of polymer films or doping glass with metal ions to absorb or reject certain wavelength range of the electromagnetic radiation. Light transmission through windows using such technologies is fixed once the window structures are constructed.

In recent times, there has been great interest in using variable light transmission glass or glazing to achieve electromagnetic radiation control. A summary of variable tinting window developments can be found in, for example, "Chromogenic Switchable Glazing, Towards Development of the Smart Window" by Carl Lempert, published in the June 1995 Proceedings of the Window Innovation Conference, Toronto, Canada; and "Optical Switching Technology for Glazings" by Carl Lempert, published in Thin Solid Films, Volume 236, 1993, pages 6-13.

Several different types of chromogenic switchable glazing structures have been discovered using suspended particle devices, electrochromic effects, and certain types of liquid crystal. In general, the structures absorb the incident light or diffuse the incident light.

A glazing structure disclosed in U.S. Pat. No. 5,940,150 proposes an adjustable trans-reflective window that is primarily based on two layers of cholesteric liquid crystals and their ability to reject or to transmit one circular polarized light depending on the electric stimulus applied while capable of transmitting the other. However, a specific cholesteric liquid crystal typically works in only a narrow bandwidth of light and a stack of liquid crystal materials are needed to broaden the working wavelength range of the device. Thus, significant material as well as device development effort is needed in order that the glazing structure be practical. The patent also teaches a glazing structure sandwiching a controllable retardation film between two linear reflective polarizers. Such a glazing structure will reflect theoretically 50% to 100%, and transmit 50% to 0%, of naturally polarized light depending on the external stimulus applied. The theoretical contrast ratio between the maximum reflection state and the minimum reflection state of the glazing structure employing linear reflective polarizers disclosed in that patent is therefore only 2:1, making it less desirable as an electrically controllable mirror.

The foregoing examples of the related art and limitations related therewith are intended to be illustrative and not exclusive. Other limitations of the related art will become apparent to those skilled in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

One aspect of the present invention relates to a glazing structure that includes a first layer transmissive to light; a second layer transmissive to light; a layer of electrically controllable optically active material disposed between the first layer and the second layer; a first polarization layer disposed to one side of the optically active layer that transmits light of a first polarization orientation and reflects light of the second polarization orientation; and a second polarization layer disposed to an opposite side of the optically active layer that transmits light of one polarization orientation and absorbs light of another polarization orientation. The optically active layer can be controlled to either pass light without affecting the polarization or to pass light while rotating the polarization thereof. The glazing structure is transmissive to light when the optically active layer passes light without affecting the polarization and the glazing structure reflects a substantial portion of the light that first enters the glazing structure from the opposite side when the optically active layer passes light while rotating the polarization thereof.

The optically active layer may include nematic liquid crystal material. The optically active layer may be controlled to rotate the polarization orthogonally. The glazing structure may further include a pair of layers of indium-tin-oxide (ITO) acting as electrodes to allow an electric field to be applied to the optically active layer. At least one of the electrode layers may be divided into a plurality of separate segments to allow different electric fields to be applied to different portions of the optically active layer. The first and second transmissive layers include glass.

The first polarization layer may be a reflective polarizer. The second polarization layer may be an absorptive polarizer. The second polarization layer may be a reflective polarizer. The second polarization layer may include an absorptive polarizer and a reflective polarizer. The first polarization layer and the second polarization layer may each be linear polarizers.

Another aspect relates to a glazing structure that includes a substrate; and means associated with the substrate for selectably controlling the amount of light transmitted through the glazing structure and the amount of light reflected by the glazing structure, the means including at least one reflective linear polarizer and at least one absorptive linear polarizer. The means controls the transmission and reflection of light at wavelengths across the entire visible and infrared light spectrum. The means also controls the amount of transmission and reflection with the selective application of electrical signals and without movement of mechanical components.

Another aspect relates to a method for controlling the amount of light transmitted through and reflected by a glazing structure. The method includes providing a substrate with multiple layers applied thereto, wherein the multiple layers include an optically active layer, a reflective linear polarizer layer, and an absorptive linear polarizer layer; and applying an electrical signal to at least one of the layers to change the amount of light transmitted through the glazing structure, wherein the transmission of light at wavelengths across the entire visible and infrared light spectrum is changed.

Applying the electrical signal may also change the amount of light reflected by the glazing structure.

Another aspect relates to a glazing structure that includes a first glass layer; a second glass layer; a layer of liquid crystal material disposed between the first layer and the second layer; a first polarization layer disposed to one side of the liquid crystal layer that transmits light of a first polarization orientation and reflects light of the second polarization orientation; a second polarization layer disposed to an opposite side of the liquid crystal layer that transmits light of one polarization orientation and absorbs light of another polarization orientation; and a pair of transparent, electrically conductive layers disposed on opposite sides of the liquid crystal layer. The liquid crystal layer can be controlled by selective application of electrical signals to the transparent conductive layers to either pass light without affecting the polarization or to pass light while rotating the polarization thereof. The glazing structure is transmissive to light when the liquid crystal layer passes light without affecting the polarization and the glazing structure reflects a substantial portion of the light that first enters the glazing structure from the opposite side when the liquid crystal layer passes light while rotating the polarization thereof.

At least one of the electrically conductive layers may be divided into a plurality of separate segments to allow different electric fields to be applied to different portions of the optically active layer.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Reference will now be made to the accompanying drawings, which assist in illustrating the various pertinent features of the present invention. Although the present invention will now be described primarily in conjunction with windows, it should be expressly understood that the present invention may be applicable to other applications where it is desired to control the transmissivity or reflectivity of a substrate. In this regard, the following description of a window is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use (s) of the present invention.

Embodiments disclosed herein relate to providing windows with controllable reflectivity, which for example can be changed from being substantially transmitting to substantially reflecting. In one embodiment, a glazing structure with high contrast in the reflected light between minimum and maximum reflecting states is provided. In another embodiment, a glazing structure that could substantially control the transmittance and reflectance of the visible spectrum of the electromagnetic radiation, and separately control the infrared spectrum, is provided. In other embodiments, a trans-reflective glazing structure as a standalone unit that can be operated by batteries and or solar cells is provided. Various aspects, embodiments, and features are described in further detail below.

Figure 1:
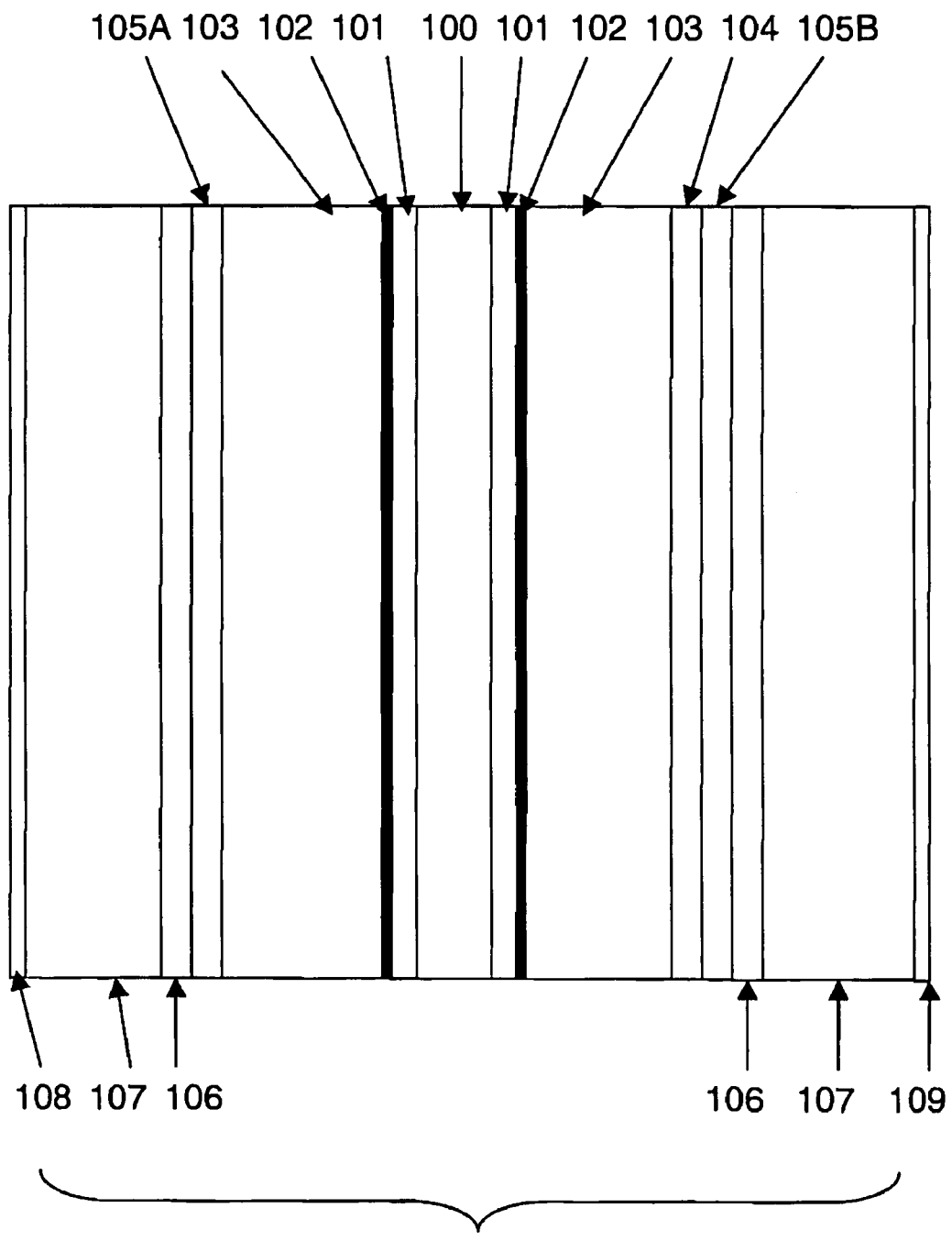
FIG. 1 is a schematic view of layers in a window of the present invention.

FIG. 1 shows the multiple layers in a multi-layered structure making up an exemplary window 20. In this structure, the electrically active optical layer 100 is a nematic liquid crystal thin film of about 4 to 25 microns in thickness. The nematic liquid crystal materials (commonly used for thin film transistor driven liquid crystal displays and readily purchased from companies such as Merck KGaA of Germany or Chisso Corporation of Japan) can be used as an electrically active optical layer in this structure. The electrically active optical layer 100 is aligned by treated surface layers 101 which can be rubbed polyimides such as SE610 from Nissan Chemicals. The electrical stimulus is applied to the electrically active optical layer 100 via optically transparent, conductive Indium Tin Oxide (ITO) layers 102, which are directly deposited on substrates 103. Such a standard glass substrate is the ITO coated Corning 1737F borosilicate glass from Corning, Inc. The ITO layer 102 may cover the entire substrate 103, or may be pixellated so that different regions of the window structure may be controlled in opacity and reflectance independently. A desirable substrate in some instances could be an ITO coated plastic substrate that is flexible, where the assembled window structure will be able to assume curved shapes. Assembled structures 103, 102, 101, and 100 are generally commercially available, if the substrates 103 are glass, from a large number of companies including, for example, Shenzhen Shenhui Technology Co., Ltd. of China, Samsung Electronics of South Korea, and Chunghwa Picture Tubes, LTD of Taiwan.

The next layer in one direction is an absorptive polarizer 105A. The next layer in the other direction is a reflective polarizer 104. Absorptive polarizer 105B can be pre-assembled to reflective polarizer 104 such that the polarized light transmission direction of the reflective polarizer 104 is parallel to that of the absorptive polarizer 105B. If the reflective polarizer 104 is linear, it reflects one polarization while transmits the orthogonal polarization of light incident on it. On the other hand, the absorptive polarizer 105, if linear, absorbs one polarization while transmitting the orthogonal polarization of light incident on it. Absorptive polarizers with pressure sensitive adhesive layers are available from companies such as Sanritz Corporation of Japan. Alternatively, polarizers preassembled with a compensation film, such as those wide viewing angle absorptive polarizers from Sanritz Corporation, are particularly attractive in electrooptic glazing applications to provide high contrast tinted windows even for obliquely incident light. Linear reflective polarizers are becoming available relatively recently, including Dual Brightness Enhancement Films (DBEF) with adhesive layer (DBEF-a) from 3M Corporation, and wire grid based polarizers from Moxtek, Inc.

The next layers are transparent polymer layers 106 where the layers serve multiple purposes including shock absorption, UV blocking, index matching, and anti-glass shattering. A common polymer layer is that of polyvinyl butyrate from Solutia, Inc. The next layers are protective substrates 107, where glass used for conventional window glass can be used and is laminated on the interior structures 106 through 100 using either a pressure treatment process or heat curing process, depending on adhesive films used in the stack. Alternatively, treated glass, such as those from DENGLAS Technologies, LLC, offers advantages of increased transmission, reflection, and antiglare when used as protective substrates 107, where the glass substrates are coated with broadband antireflection coatings. Yet another alternative is to laminate antireflection polymer films 108, such as those from Toppan Printing Co. Ltd of Japan, on uncoated glass of 106 to reduce glare and to increase transmission of the window stack. Furthermore, UV absorbing or rejecting film 109, such as the Llumar series from CPFilms, Inc. is laminated on the stack to reduce the amount of UV from ambient or from Sunlight to enter into the building and to reduce potential damage to the electrically active optical layer 100 or other polymer based components in the window structure.

Figure 2A:
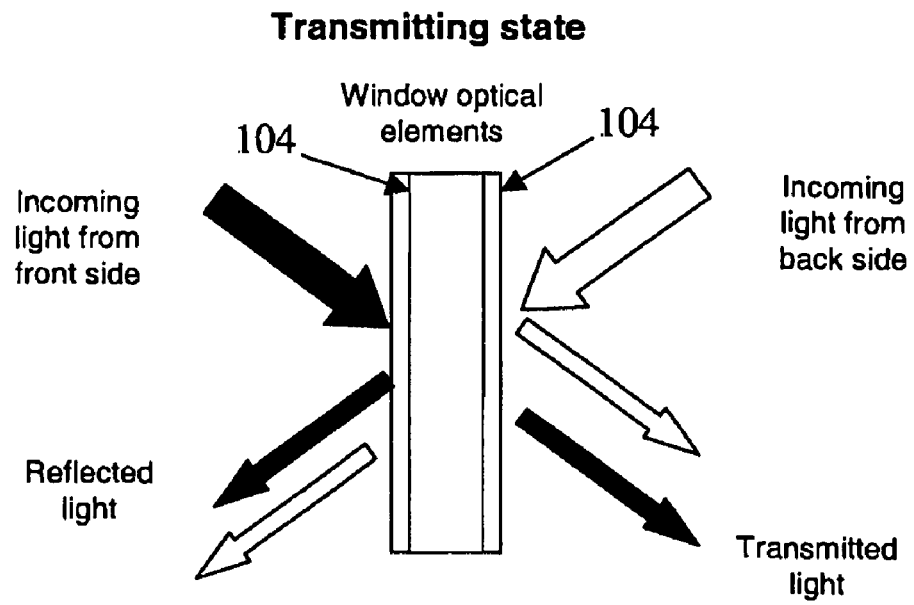
FIGS. 2A and 2B are schematic views of a prior art window.
Figure 2B:
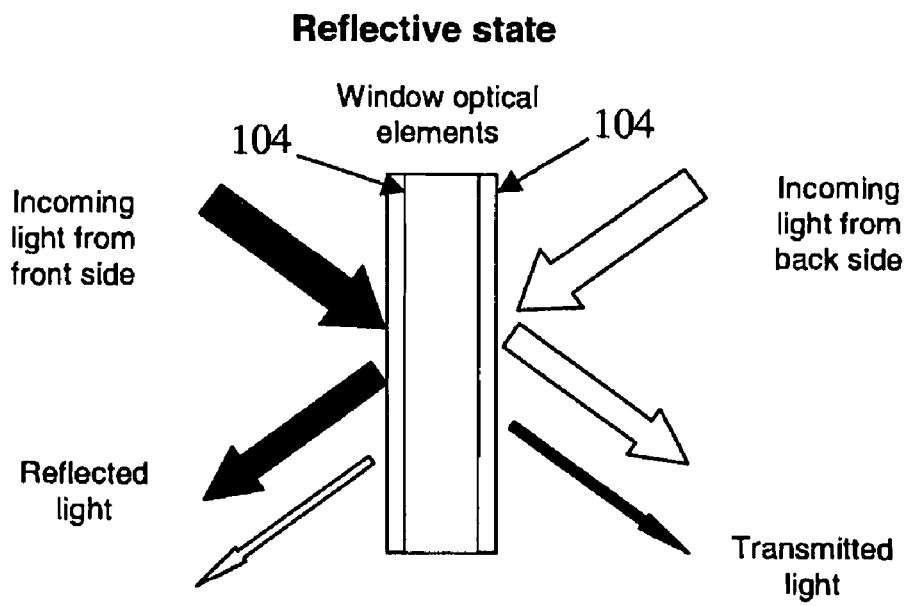

FIGS. 2A and 2B show the glazing structures described in U.S. Pat. No. 5,940,150. As illustrated in the figure, the minimum reflection on either side of the glazing structure is always 50% of the light incident on the structure.

Figure 3A:
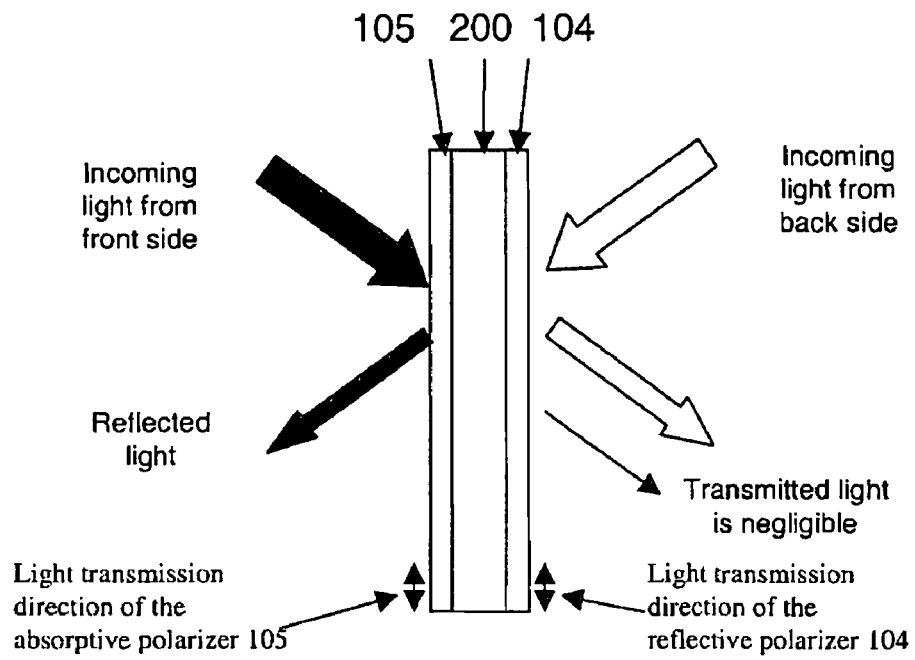
FIGS. 3A and 3B are schematic views of the operation of a first embodiment of a window of the present invention, in which the polarizers are parallel.
Figure 3B:
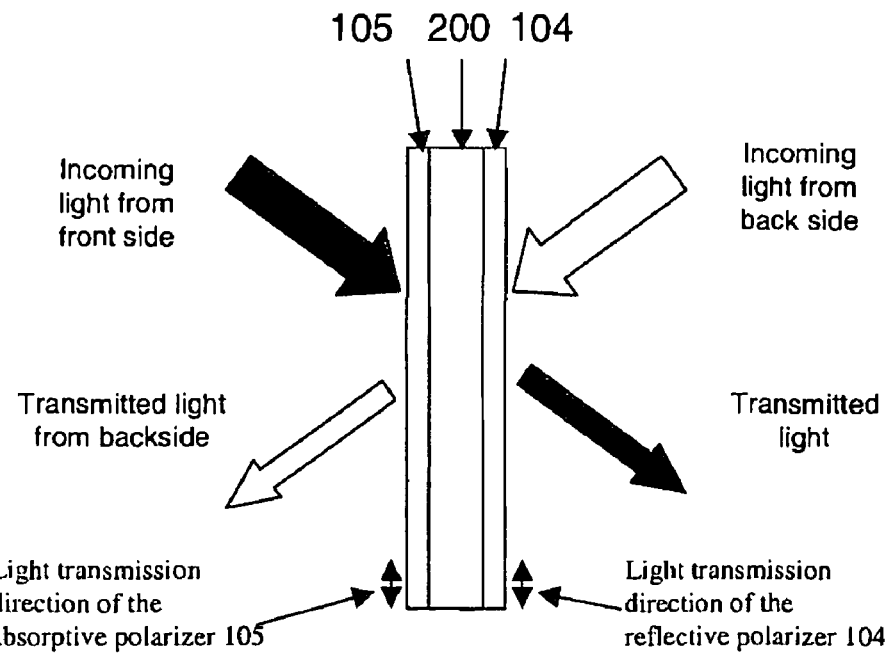

FIGS. 3A and 3B show an embodiment of operation of an electrically controllable reflective window. Light, in the infrared, visible, and/or ultraviolet range of the electromagnetic spectrum is incident on the window and must be either absorbed, transmitted, or reflected. The window includes optical elements (as discussed further below) that in combination enable control of the reflection and transmission characteristics of incident light. Thus, in the transmitting state, which is obtained by applying appropriate voltage to the electrically active optical element or elements of the window, the incident light is substantially transmitted (perhaps in the range of 50%) and reflection is minimized. In the reflecting state, obtained by appropriately applying a different voltage to the electrically active optical element or elements of the window, the incident light is substantially reflected and transmission minimized. Similarly intermediate states of reflection and transmission can be obtained by intermediate voltage conditions. Such controllable reflection/transmission effects may be operative over a selected range of optical wavelengths. Thus, such electrically controllable reflective windows operative in the infrared can be used to control the heat transmission or rejection of the window.

In controlled tinting applications, the transmission of a window or lens can be adjusted by external means. An important mode of control in tinting applications is the electrical manipulation of optical polarization. Embodiments of the invention relate to the creation of windows with actively-controllable reflectivity through the use of an electrically active optical element or elements that affect the polarization state of light transmitted or reflected, in combination with an optical element or elements that act as polarizers, exhibiting optical effects on one optical polarization state that are substantially distinct from those on another optical polarization. Examples of optically active optical elements include for example films of electrically active materials, such as liquid crystals that change the polarization of light in a way that depends on the voltage applied. Examples of inactive optical elements includes, for example, absorptive polarizers that absorb one optical polarization state while transmitting the other or reflective polarizers that reflect one optical polarization state while transmitting the other.

In one embodiment of the invention, a window includes at least one optical element that is active, (e.g., with electrically controllable optical characteristics), and at least one element that acts as a reflective polarizer. These two functionalities may be obtained in a single optical element or in a combination of electrically active and electrically passive elements. Reflective electrooptic polarizers are advantageous in many window and lens tinting applications, particularly those for which there is a need for privacy, or where it is beneficial for the unwanted transmitted radiation to be reflected rather than absorbed.

The action of a reflective polarizer can be understood by considering how light travels in optical media. Light is electromagnetic radiation that can only propagate as one or the other of a pair of normal modes of polarization (polarization eigenstates). For isotropic optical media, an infinite number of distinct pairs of normal modes are possible, but for propagation in an anisotropic (birefringent) or gyrotropic (optically active) medium only specific pairs of polarization eigenstates are available to the light. These polarization states are orthogonal, meaning that any arbitrary polarization state can be made up as a unique linear combination of the two. Examples of pairs of orthogonal polarization eigenstates are: (a) perpendicular linear polarizations; (b) left and right circular polarizations; and (c) orthogonal elliptical polarizations. Thus, for birefringent media, the polarization eigenstates are linearly polarized along the mutually perpendicular optic axis symmetry directions, and for gyrotropic media the polarization eigenstates are left and right handed circular polarization. The orthogonal polarization eigenstates may have very different transmission and reflection characteristics in anisotropic or gyrotropic media, depending on the details of the material. For example, one linear polarization can be strongly absorbed while the orthogonal linear polarization is transmitted with little loss. This is the principle of operation of absorptive polarizers. On the other hand, it may be that one polarization state is strongly reflected while the other is transmitted with low reflection. This is the principle of operation of reflective polarizers. A variety of ways are known in the art of making reflective polarizers, including: exploitation of the polarization dependence of the interface reflectivity of birefringent crystals at non-normal incidence and of multilayer stacks of birefringent films; and by use of interference of light in periodically modulated optical media, such as chiral liquid crystals. Any of these known means can be used as the reflective polarizer element in the windows of the current invention.

A reflective electrooptic polarizer derives its polarization selectivity principally by exhibiting a different optical reflectivity for different polarization states, and has no absorptive elements specifically introduced to select polarization. A further advantage of reflective polarizers is that in the visible spectrum range they can be made with very little loss of the transmitted polarization, as opposed to absorptive polarizers where the transmittance is reduced by imperfect alignment of the light absorbing dyes affecting the polarization selection. By contrast, with typical reflective polarizers, there will be minimal additional light loss of the transmitted polarization state, and depending on the choice of the polarizer technology, very close to 50% of natural light can be transmitted.

Thus, with the use of reflective polarizers in combination with an active optical element the unwanted optical energy is dispersed externally to the window or lens rather than being absorbed and causing radiation damage or being converted to heat. Thus, reflective polarizers can effectively assist in providing protection against UV transmission through the window or lens. In addition, systems employing reflective polarizers such as shown in FIGS. 3A-3B can be structured to provide very effective rejection of infrared radiation, the wavelengths of light longer than that of visible light which carry a significant portion of the energy of sunlight. Thus, if the active layer is designed to have little effect on polarization at infrared wavelengths, with a crossed polarizer and analyzer, incident infrared radiation would then be nearly completely reflected, reducing the heat passing through the window or lens.

An additional advantage of the use of reflective polarizers in window and lens tinting applications is that they can provide privacy under a wide range of natural lighting conditions. Since natural light is at best only weakly polarized, on the order of 50% of incident natural light is reflected by a reflective polarizer. This reflected light is much stronger than that passing through a window or lens from behind in typical applications. Thus objects on the dimmer interior side of the window will be obscured to observers on the brighter side by the reflected exterior light, as illustrated in FIGS. 3A-3B and 4A-4B. Privacy can be further enhanced by controlling the tint to allow less transmission of light through the window or lens.

In an alternative embodiment, it may be desirable for the window to exhibit strong reflective characteristics on only one side, such as illustrated in FIGS. 5A-5B and 6A-6B. In this case, light passing from left to right through the window is controlled in transmission and reflection, whereas light incident on the right is controlled in transmission but always exhibits only weak reflection.

Figure 4A:
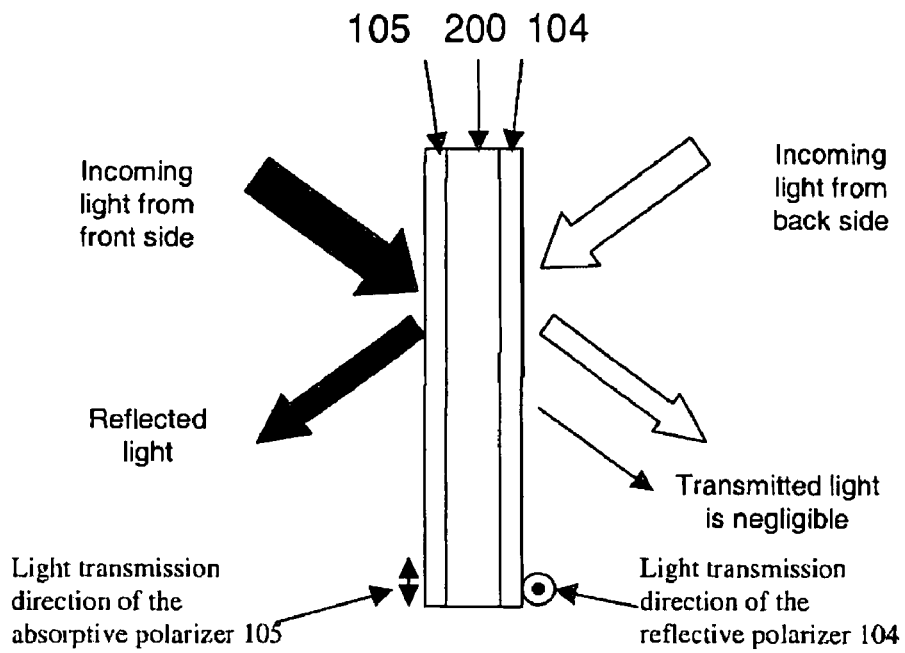
FIGS. 4A and 4B are schematic views of the operation of the first embodiment of a window of the present invention, in which the polarizers are crossed.
Figure 4B:
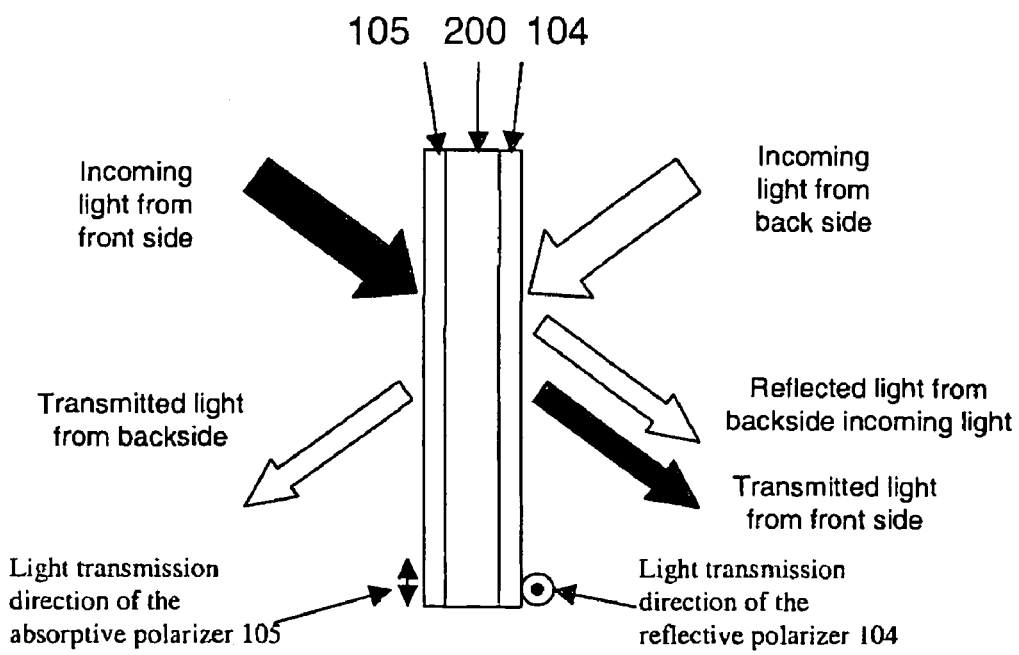
Figure 5A:
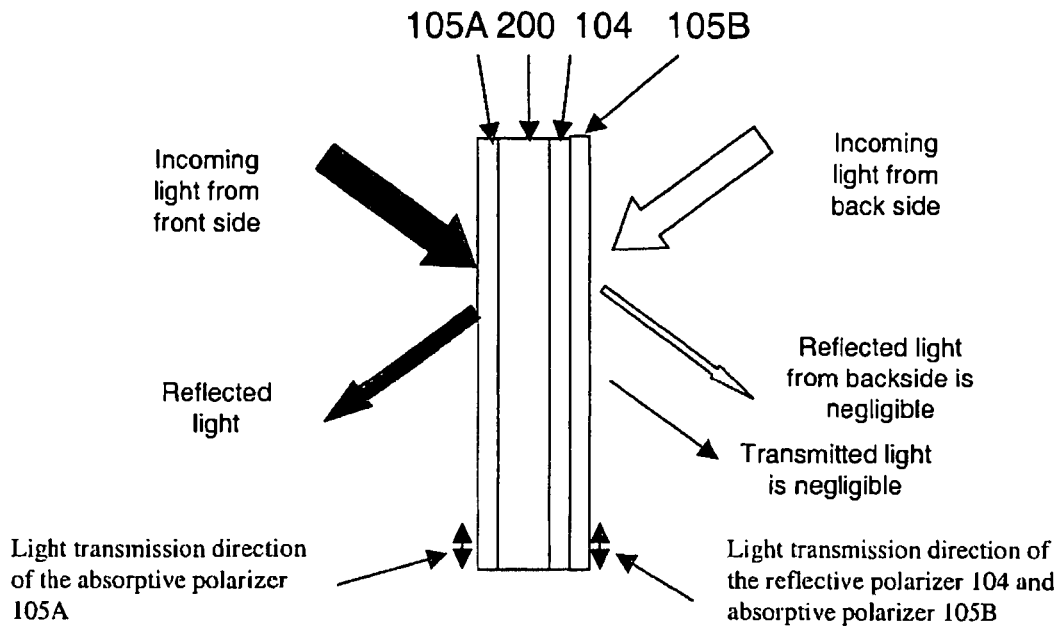
FIGS. 5A and 5B are schematic views of the operation of a second embodiment of a window of the present invention, in which the polarizers are parallel.
Figure 5B:
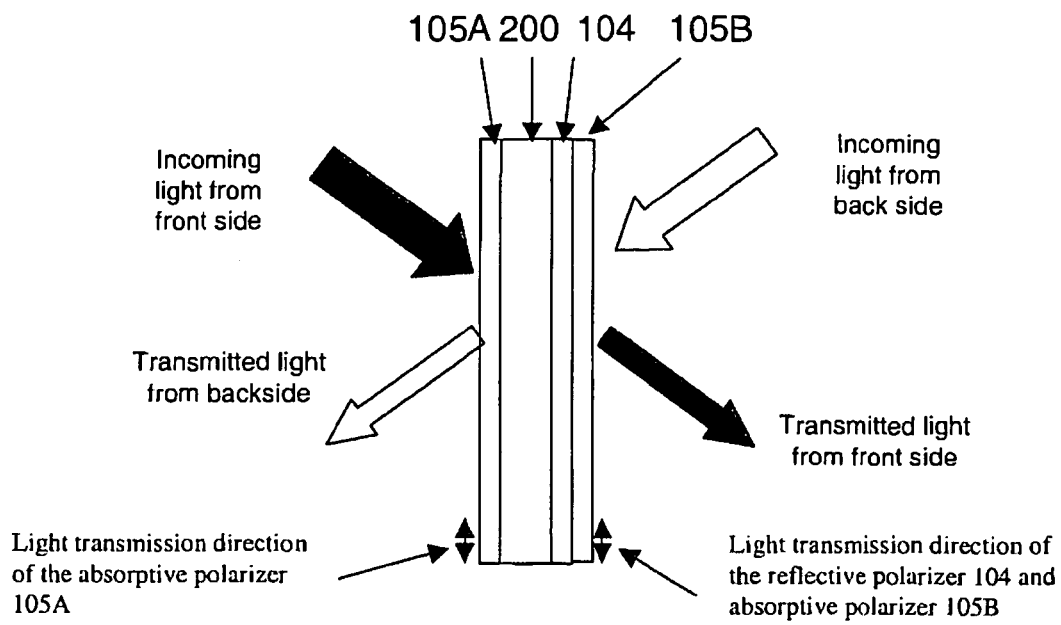

FIGS. 3A-4B show a first embodiment of a controllable tint optical structure, including a sandwich of an absorptive polarizing film, an active layer that changes the polarization of light in response to an external stimulus, and a reflective polarizing film acting as an analyzer, to provide polarization selective reflection of the light exiting the active layer. For light entering from the absorptive polarizer side (the front side), one polarization state of the light is absorbed and the other state is transmitted. For light entering the reflective side, one polarization state of the light is reflected and the other is transmitted into the active layer. For the case of linear polarization and with the parallel polarizer orientations in FIGS. 3A-3B, when the active layer is activated, the polarization of the light is rotated. The light entering from the absorptive polarizer side is reflected by the reflective polarizer, which subsequently transmits through the absorptive polarizer. In such case, this light is reflected by the device. The light entering from the reflective polarizer side is absorbed by the absorptive polarizer, and the device is opaque in transmission. When the device is not activated, the polarization state of the light that transmitted through the absorptive and reflective polarizers from either side is transmitted. The device is then transparent, and further functions as a polarizer for light entering from the reflective polarizer side. FIGS. 4A-4B show another configuration of the device in which the transmitting polarization state of the absorptive and that of the reflective polarizing films are orthogonal or crossed. In this latter case, the device is transparent when active and, for linear polarization, rotates the plane of polarization as well, and is opaque when the layer is not active. The devices can be tuned between the two extreme transparency states when an active layer with continuously tunable polarization rotation power is used.

Figure 6A:
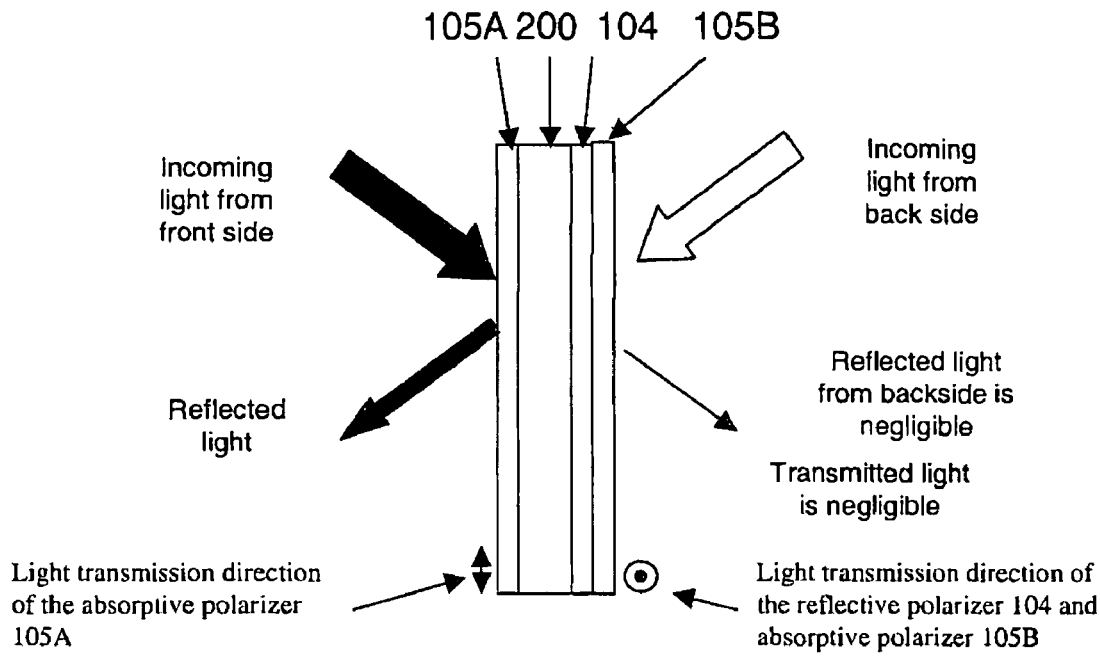
FIGS. 6A and 6B are schematic views of the operation of the second embodiment of a window of the present invention, in which the polarizers are crossed.
Figure 6B:
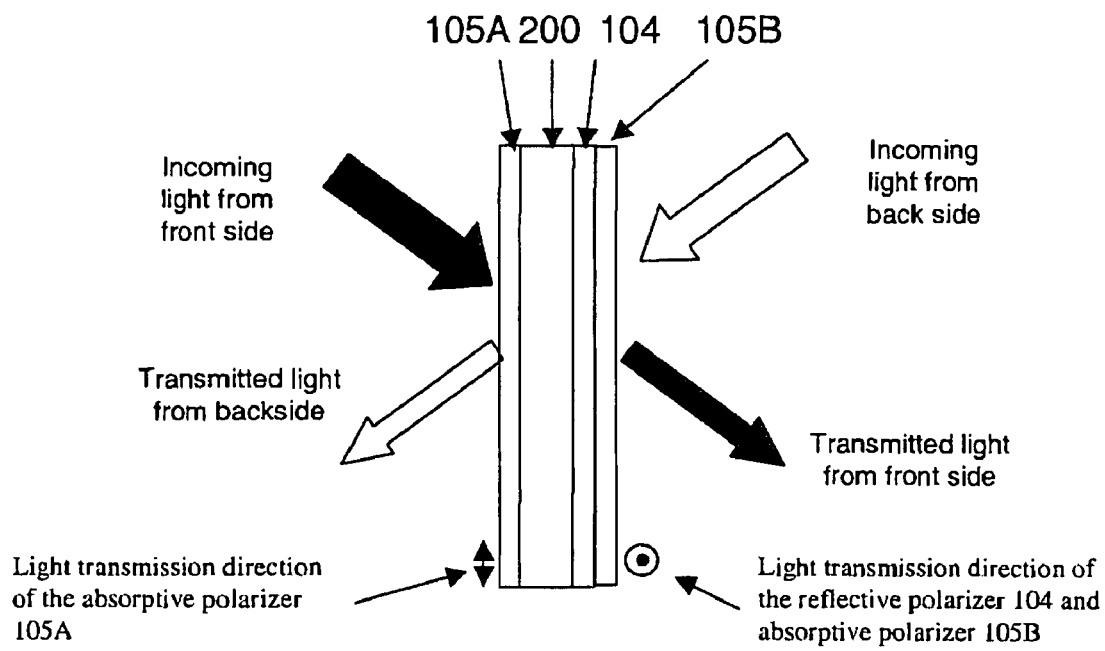
Figure 7A:
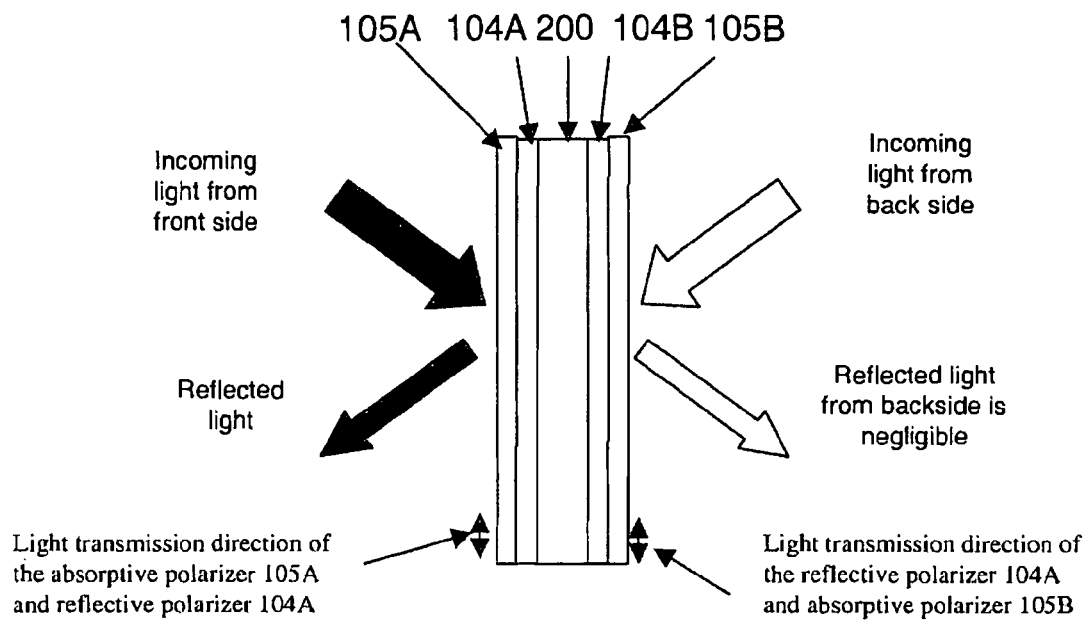
FIGS. 7A and 7B are schematic views of the operation of a third embodiment of a window of the present invention, in which the polarizers are parallel.
Figure 7B:
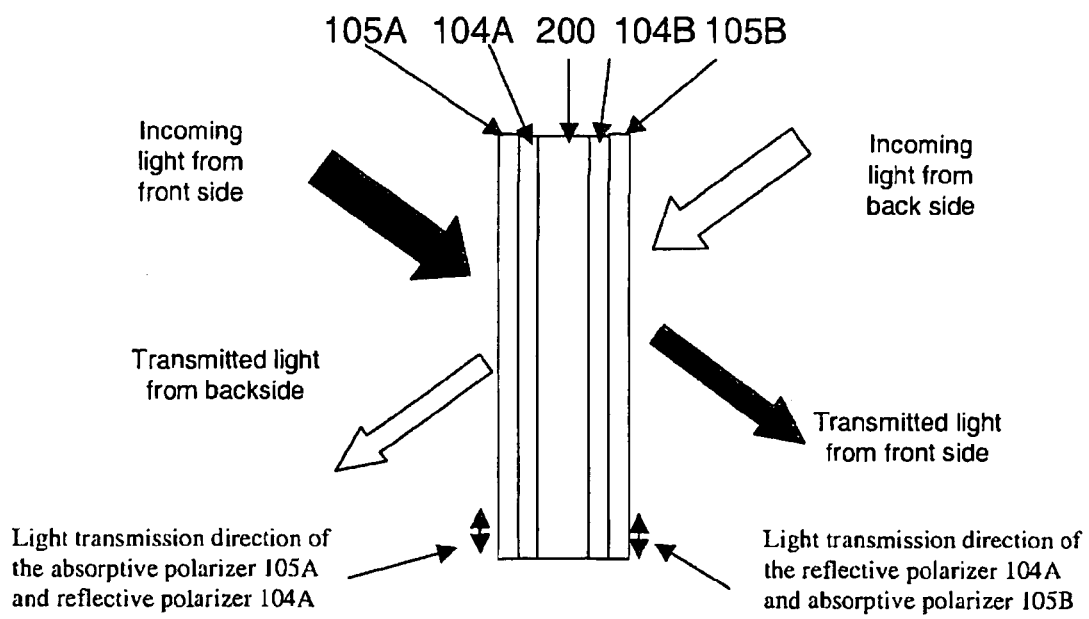

FIGS. 5A-6B show a second embodiment of a controllable tint optical structure, including a sandwich of a first absorptive polarizing film 105A, an active layer 200 that changes the polarization of light in response to an external stimulus, a reflective polarizing film 104, and a second absorptive polarizing film 105B transmitting the same polarization state as the reflective polarizing film 104. The transmission axis of the second absorptive polarizing film 105B is parallel to that of the reflective polarizing film 104 so that the reflective/absorptive polarizing film combination selectively reflects the light exiting the active layer but absorbs the reflection of the light entering from the second absorptive polarizing film. With the polarizer orientations in FIGS. 5A-5B, when the active layer is activated, the polarization of the light is rotated. The light entering from the first absorptive polarizing film side is reflected by the reflective polarizer, which subsequently transmits through the absorptive polarizer. The light entering from the reflective/absorptive film combination side is absorbed by the absorptive polarizer, and the device is opaque in transmission. When the device is not activated, the polarization element of the light that transmitted through the absorptive and reflective polarizers from either side is transmitted and the device is transparent. FIGS. 6A-6B show another configuration of the device in which the polarization directions of the polarizing films are crossed, so that the polarization direction of the reflective polarizer/second absorptive polarizer is orthogonal to the polarization direction of the first absorptive polarizer. In this latter case, the device is transparent when the device is active or has the polarization rotation power and opaque when the layer is not active. The devices can be tuned between the two extreme transparency states when an active layer with continuously tunable polarization rotation power is used.

Figure 8A:
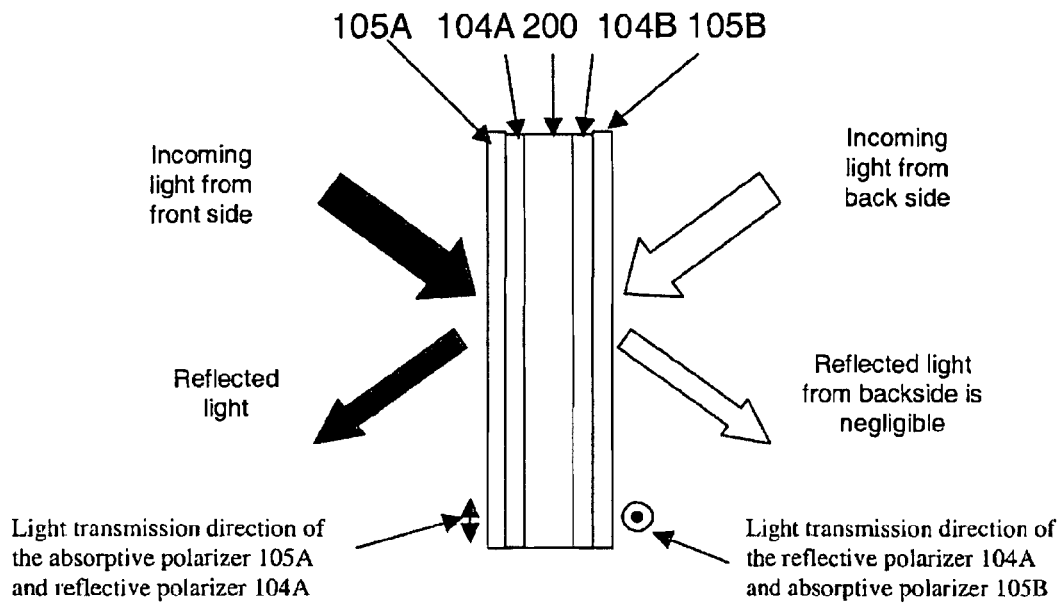
FIGS. 8A and 8B are schematic views of the operation of the third embodiment of a window of the present invention, in which the polarizers are crossed.
Figure 8B:
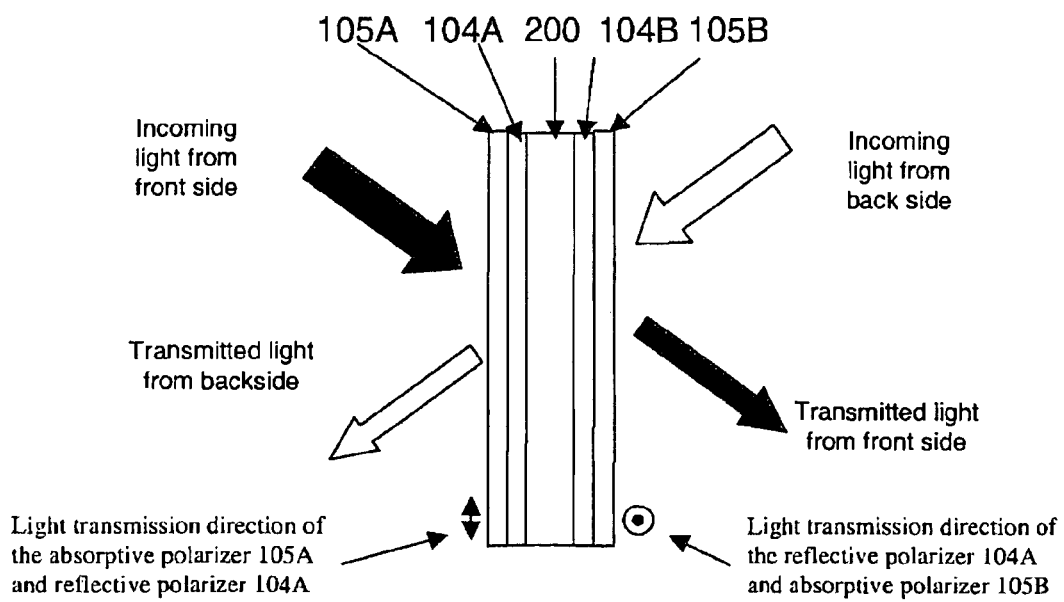

FIGS. 7A-8B show a third embodiment of a controllable tint optical structure, including a sandwich of a first absorptive polarizing film 105A, a first reflective polarizing film 104A whose transmission state is substantially the same as the transmission state of the first absorptive polarizer 105A, an active layer 200 that changes the polarization of light in response to an external stimulus, and a second reflective polarizing film 104B, and a second absorptive polarizing film 105B whose transmission state is substantially the same as the transmission state of the second reflective polarizer 104B. In this structure, the reflection of the light from the surfaces of absorptive polarizer films of 105A and 105B is minimized regardless of the state of the active layer. With linear polarizers and parallel orientations in FIGS. 7A-7B, when the active layer is activated, the polarization of the light entering to the active layer is rotated, and the light is reflected, making the device opaque in transmission. In this case, the absorptive polarizers 105A and 105B absorb residual depolarized light and further reduce the light leakage. When the device is not activated, one polarization state of the light is transmitted. The device is thus transparent, and further functions as a polarizer. FIGS. 8A-8B show a slightly different configuration of the device in which the polarization direction of the polarizers on the first side are crossed relative to those on the left side. In this latter case, the device is transparent when the device is active or has the polarization rotation power and opaque when the layer is not active. The devices can be tuned between the two extreme transparency states when an active layer with continuously tunable polarization rotation power is used.

Controllable windows exploiting the structure shown in the embodiment of FIGS. 7A-8B may be particularly desirable if the absorptive polarizing film absorbs visible spectrum of light but not the infrared heat while the reflective polarizer shows uniform reflectance and transmittance to the respect polarization of light across the visible and infrared spectrum. The controllable window unit will substantially reject or allows nominally 50% of heat to transmit through the window, while maintaining desirable controllable reflective effects in the visible spectrum.

Figure 9:
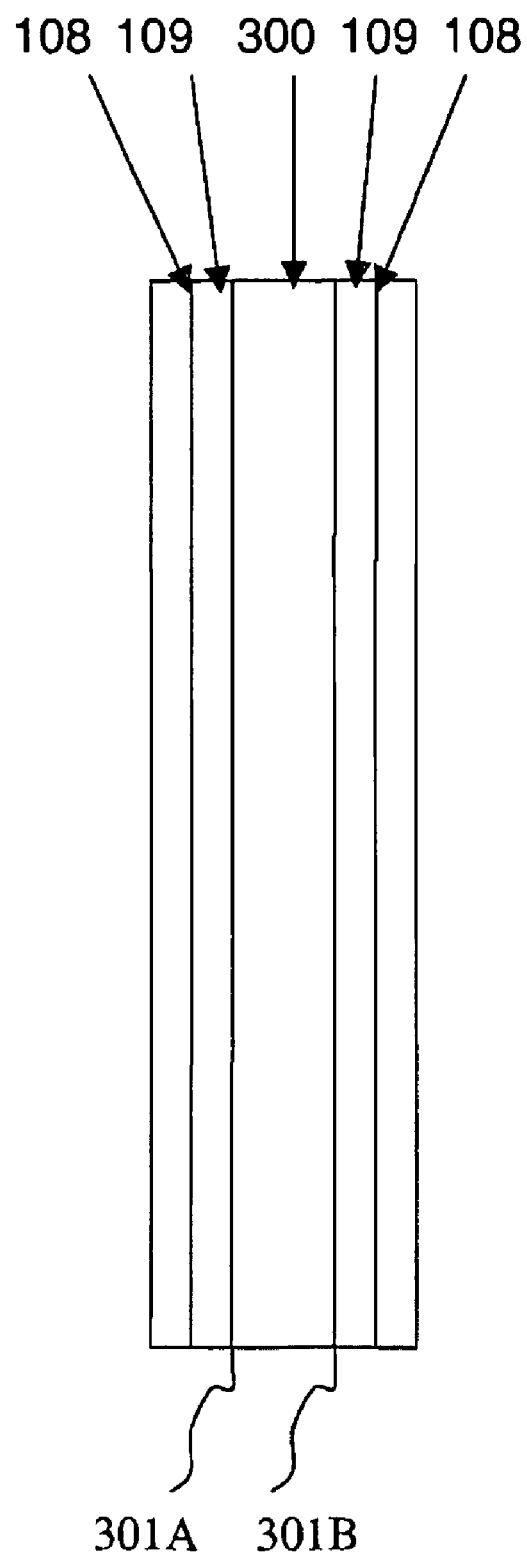
FIG. 9 is a schematic view of a glazing structure using one of the windows of the present invention.

FIG. 9 shows a glazing structure using any structure shown in FIGS. 3A to 8B and shown in FIG. 9 as element 300. With a UV protection film 109 laminated on the structure 300 on one side or both as shown, and with antireflection film 108 laminated on one side or both as shown, the glazing structure could be a standalone insert to the existing window structures, or could be used as the center piece of a framed window structure. The glazing structure is electrically controlled via electrodes 301A and 301B, or multiple of which if the transparent conductive film ITO of the element 300 is segmented.

In the embodiments described above, the optically active layer may require a low power to activate, de-activate, and to maintain the chosen state. Thus the glazing structure could be operated using batteries, and or solar panels, and could be made into standalone units remotely controlled by a remote controller, or an automated light and temperature system as part of the standalone window system. Such a remote controller typically operates based on either an infrared pulse signal or a radio frequency signal. Such remote controlled and standalone units thus can be installed into existing window structures as retrofit units.

Figure 10A:
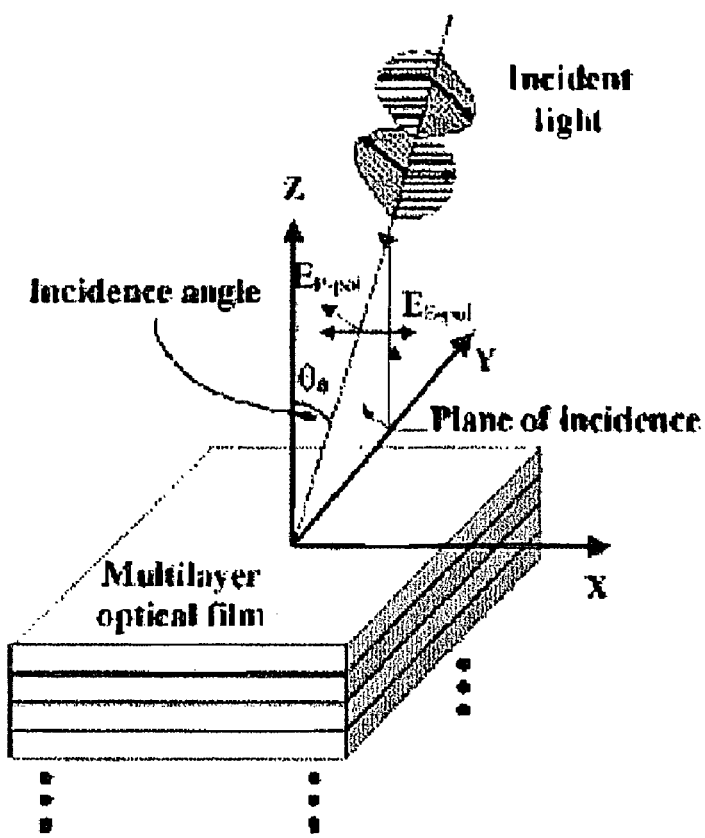
FIGS. 10A and 10B show the structure and characteristics of birefringence-based polarizers.
Figure 10B:
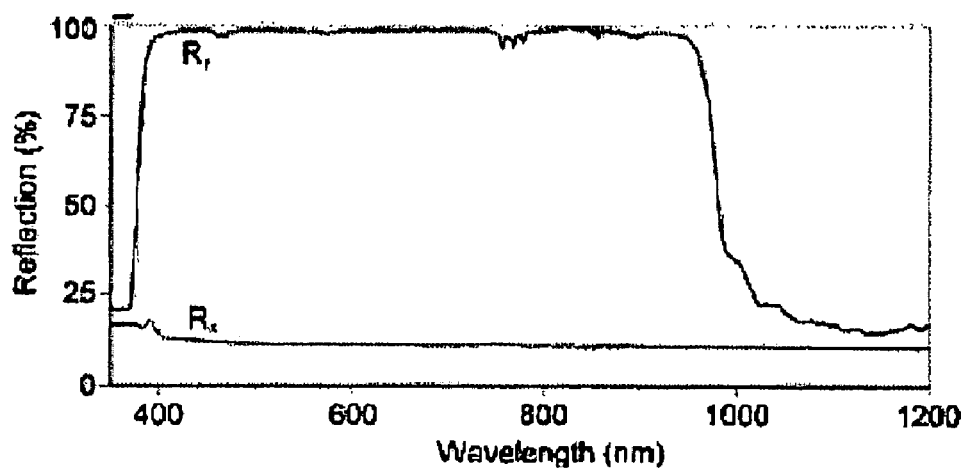

A variety of reflective polarizers can be employed within the scope of this invention. These include (but are not limited to) various birefringence based reflective polarizers as shown in FIGS. 10A-10B that come from M. F. Weber, C. A. Stover, L. R. Gilbert, T. J. Nevitt, A. J. Ouderkirk, *Science* 287, 2451 (2000) and show the reflectance for multilayer reflecting polarizer whose indices include alternating layers that are matched along both the x and z axes and mismatched along the y axis. For this example, $n_{1x}=1.57$, $n_{1y}=1.86$, $n_{1z}=1.57$, $n_{2x}=1.57$, $n_{2y}=1.57$, $n_{2z}=1.57$, and $n_a=1.0$. When measured in the y direction, reflection shows a strong band at near 100% intensity. Along the x direction, there are only air interface reflections.

Such reflective polarizing films are made by laminating highly birefringent uniaxial polymer films with isotropic films that index matches the birefringent layers in the stacking direction and in the direction perpendicular to the optic axis of the birefringent films. When the film is properly designed, light polarized in the direction of the optic axis is reflected, while light polarized in the direction perpendicular to the optic axis of the birefringent film transmits through the film, as the index of refraction is matched. Polarizing films exploiting such effects are available in large quantities and large sizes, with broad working wavelengths as well as large working angles.

Figure 11:
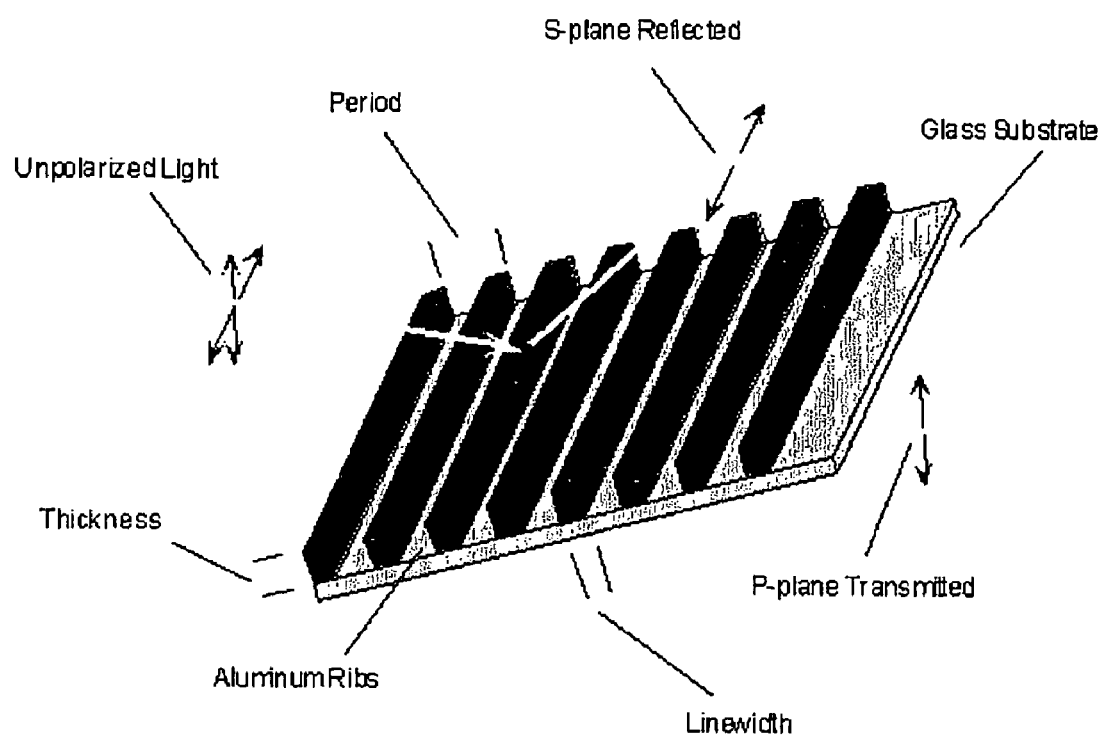
FIG. 11 shows a wire grid polarizer.

An alternative is polarization employing micro-structured grids of wires shown in FIG. 11 from Moxtek, Inc., where light with wavelengths larger than the wire spacing and with polarization parallel to the wires is reflected or redirected to an off-specular direction, and the component with polarization perpendicular to the wires will be transmitted. Wire grid polarizers have found applications in the microwave regime. Recent advances in lithography provide for construction of, for example, aluminum wires spaced 100 nm apart that can act as efficient polarizers in the ultraviolet regime. Contrast ratio of over 1000:1 can be achieved for wire grid polarizers for wavelengths a few times larger than the minimum wire spacing, with minimal loss in reflected and transmitted polarization components of light and over a large incident angle. Such a wire grid polarizer has excellent properties over a wide wavelength range and a broad temperature range.

Figure 12A:
FIGS. 12A and 12B show the operation of a twisted nematic liquid crystal.
Figure 12B:
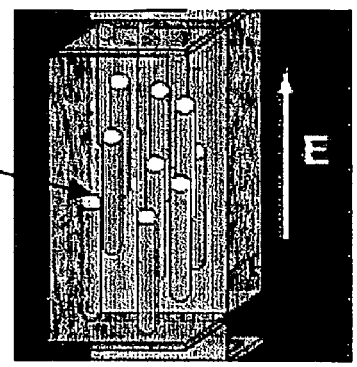

Yet a third type of reflective polarizer is the chiral nematic liquid crystal polarizer. Such polarizers can reflect one handedness of circularly polarized light while passing the other. Chiral nematic polarizers are based on optical Bragg reflection by a helical winding of molecular orientation and are thus highly wavelength selective, but can be made broadband by spatial variation of the periodicity of the reflecting helix. Similarly, a variety of active layers can be employed in embodiments of the invention. For example, most any type of liquid crystal in various operational modes can be used to achieve active modulation of polarization of light propagating through the layer. These include, for example, without limitation, the twisted nematic liquid crystal as shown in FIGS. 12A-12B, super twisted nematic, π cells, electrically controlled birefringence mode, vertical aligned nematic modes, and various chiral nematic modes, as well as electro-optical active polymers, solid state materials, and other forms of liquid crystals. For twisted nematic liquid crystals including chiral nematic liquid crystal modes, a number of polarizer orientations are possible, including parallel polarizers as shown in FIGS. 3A-3B, 5A-5B, 7A-7B, 7A-7B and crossed polarizers as shown in FIGS. 4A-4B, 6A-6B, 8A-8B. The liquid crystals may also align in different positions relative to the polarizers. In the π cells, electrically controlled birefringence mode, and vertically aligned modes, the polarizers are nominally in the crossed geometry as shown in FIGS. 4A-4B, 6A-6B, 8A-8B, and the liquid crystal optic axis in the optically activated state is substantially 45° away from the direction of the polarizers. These liquid crystal modes, depending on the application of an electric stimulus, generally can continuously modify the state of the polarization of the light propagating in the liquid crystal layer due to the fact that their molecular alignment structure changes according to the applied electric stimulus. When inserted in the structure as the active layer shown in FIG. 1, the active layer/reflective polarizer structure can achieve continuous tinting control by application of a continuously variable electric field.

Figure 13:
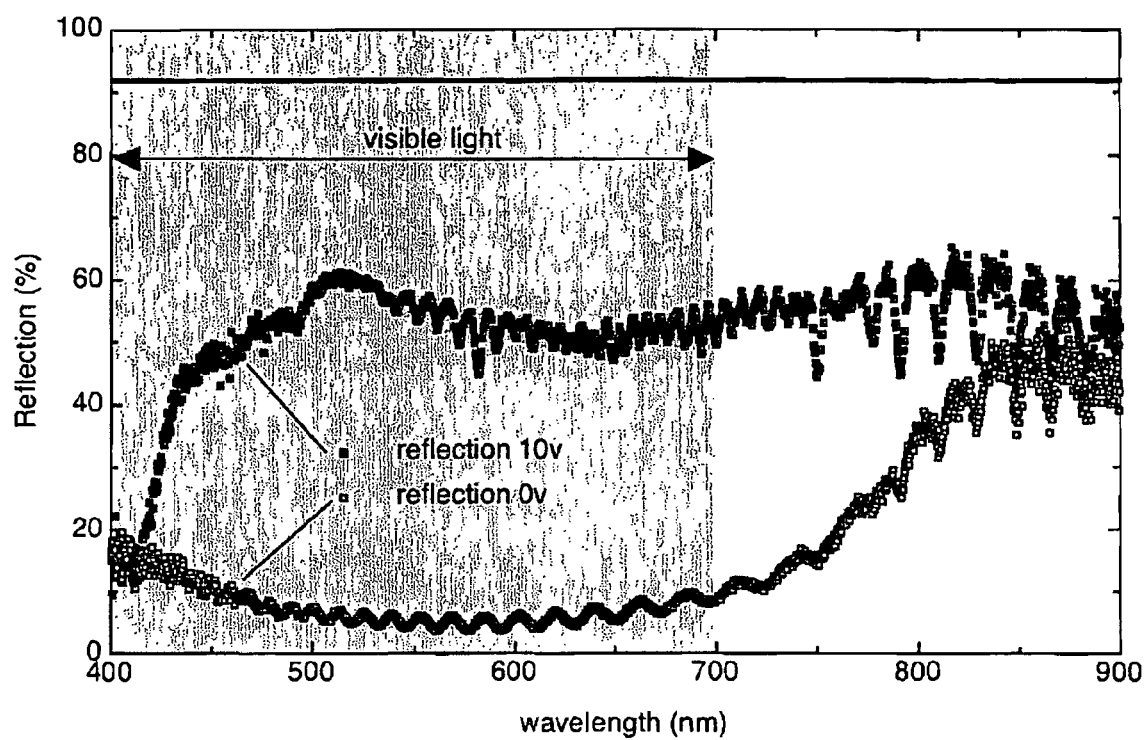
FIG. 13 shows waveforms representing the reflectivity of a window of the present invention when different levels of electrical signal are applied thereto.
Figure 14:
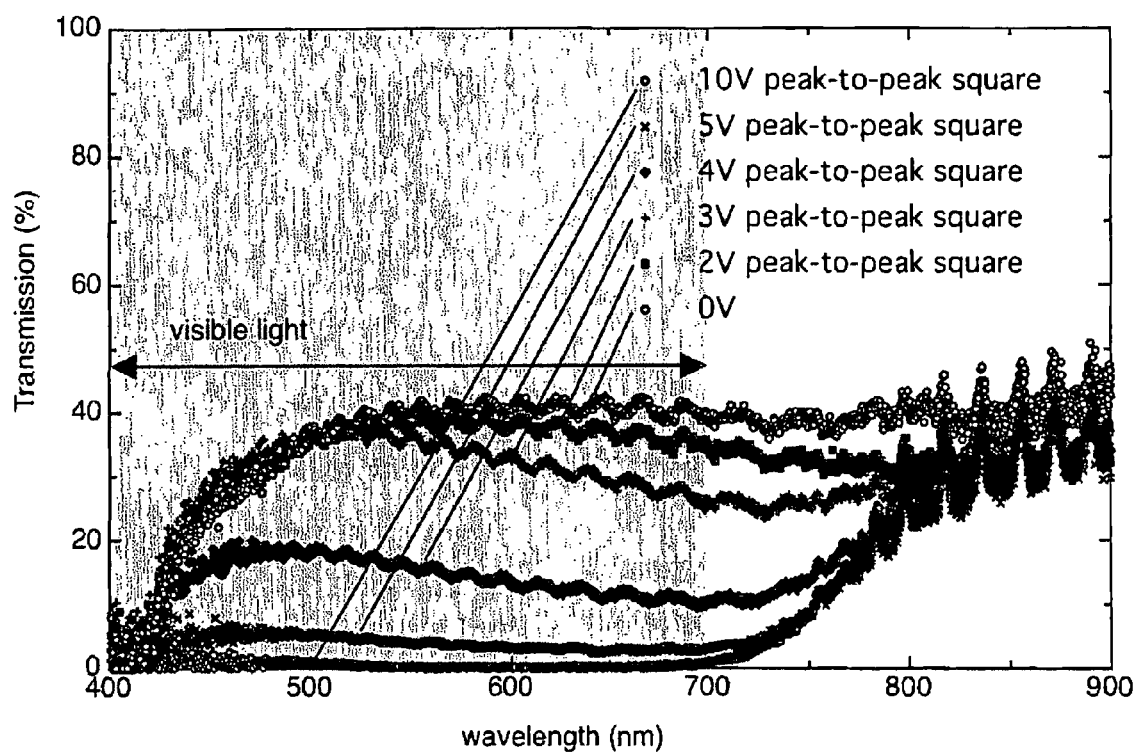
FIG. 14 shows waveforms representing the transmissivity of a window of the present invention when different levels of electrical signal are applied thereto.

By way of example, optical response of an example of the variable tinting structure (such as described above) is shown in FIGS. 13 and 14. In this case, absorptive polarizing film used is a conventional stretched dichroic dye polymer film, a twisted nematic liquid crystal device is used as the active filter, and a stacked birefringent film is used as the reflective/absorptive polarizing film combination, where the transmission axes of the absorptive and reflective polarizing film is parallel to each other, and where the reflective polarizing film is adjacent to the active liquid crystal film.

Alternatively, such devices can also employ polymeric liquid crystals, wherein the liquid crystal molecules, although attached to polymer chains, may still be reoriented by an applied field to modify the polarization of the transmitted light. Nonlinear optical materials, which change refractive index or birefringence in response to applied electric field can be used as active layers in the present invention as well.

The properties, most notably their ability to modulate the off-axis or skewed rays of light, of active layers often times can be significantly enhanced when combined with auxiliary passive films. Thus a preferred structure employs compensation films. Depending on the active layers to be used, the compensation film can be optically birefringent films and a combination of which, and or birefringent plates with varying properties such as those using discotic liquid crystals. Compensation films are generally attached to both sides of the active layer and are designed to achieve maximum compensation. Such films could be combined with a polarizer.

Figure 15:
FIG. 15 is a front view of a window having multiple segments that are separately controllable.

As mentioned earlier, the transparent ITO electrodes could be patterned into multiple segments that could be separately controlled so that the opacity, reflectivity, or transmissivity of the window could be separately controlled for each of those segments. This could effectively allow a portion of a window to become opaque while a portion remained transmissive, akin to a window blind that can be used to cover and block light through only a portion of a window. Another application may be a large reflective signage display. FIG. 15 shows an example of a window 400 with multiple transparent electrode segments 402, 404, and 406. In this case, the electrical signal to each of these three segments 402, 404, and 406 can be separately and independently controlled. For example, electrical signals to the segments could be such as to cause the regions of the window corresponding to segments 402 and 406 to be opaque while the regions of the window corresponding to segment 404 is transmissive.

As can be appreciated, adjustable tinting not only can serve to reduce excessive illumination through the window or through a lens, depending on the brightness of the environment, but can also provide privacy when such needs arise. Adjustable reflection of light of such windows can further provide aesthetic effects where the windows can behave like mirrors when the reflectivity of the window is adjusted to maximize reflectivity. For example, this may provide a spacious feeling for a home. An additional advantage of windows with controllable reflectivity is that the incident light or electromagnetic radiation (in particular, the infrared heat) from the Sun can be reflected rather than absorbed by the window or transmitted through the window into the interior. In such applications windows with controllable reflectivity, i.e. which can be changed from being substantially transmitting to substantially reflecting, can be particularly useful. Thus, the use of partially reflecting windows and lenses could be substantially enhanced if the degree of reflection can be altered at will. Thus a partially reflecting window provides privacy and optically isolates spaces in a controllable way.

It should be understood that the teaching herein apply to any transmissive structure including windows (in buildings or any other structures or vehicles), partitions, doors, display cases, display frames (such as picture frames), computer (or any other type of electronic) display, and so forth.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein. It is therefore intended that the following appended claims and claims hereafter introduced are interpreted to include all such variations, modifications, permutations, additions, and sub-combinations as are within their true spirit and scope.

What is claimed is:

1. A glazing structure, comprising:
   a first layer transmissive to light;
   a second layer transmissive to light;
   a layer of externally controllable optically active material disposed between the first layer and the second layer;
   a first polarization layer disposed to a first side of the optically active layer that transmits light of a first polarization orientation and reflects light of a second polarization orientation; and
   a second polarization layer disposed to a second side of the optically active layer that transmits light of one polarization orientation and absorbs light of another polarization orientation;
   wherein the optically active layer can be placed into a first optical state wherein the optically active layer passes light without affecting the polarization thereof, and wherein the optically active layer can be placed into a second optical state wherein the optically active layer passes light while affecting the polarization thereof; and
   wherein the glazing structure is transmissive and substantially non-reflective to light when the optically active layer is in one of the first and second optical states and the glazing structure reflects a substantial portion of the light that first enters the glazing structure from the second side when the optically active layer is in the other of the first and second optical states.

2. A glazing structure as defined in claim 1, wherein the optically active layer includes liquid crystals, and wherein the liquid crystals include nematic liquid crystal material.

3. A glazing structure as defined in claim 1, wherein the optically active layer can be controlled to rotate the polarization of light orthogonally.

4. A glazing structure as defined in claim 1, wherein the glazing structure further includes a pair of layers of transparent electrically conductive layers disposed on the first and second layers, the transparent electrically conductive layers acting as electrodes to allow an electric field to be applied to the optically active layer;
   wherein the externally controllable optically active material can be controlled by the selective application of electrical signals to the transparent electrically conductive layers to be placed into the first and second optical states.

5. A glazing structure as defined in claim 4, wherein at least one of the electrode layers is divided into a plurality of separate segments to allow different electric fields to be applied to different portions of the optically active layer.

6. A glazing structure as defined in claim 1, wherein the first and second transmissive layers include glass.

7. A glazing structure as defined in claim 1, wherein the first and second transmissive layers include transparent plastic films.

8. A glazing structure as defined in claim 1, wherein the second polarization layer is a circular polarizer that absorbs light having one of left and right circular polarization and transmits light having the other of left and right circular polarization.

9. A glazing structure as defined in claim 1, wherein the first polarization layer includes a reflective polarizer and an absorptive polarizer, and wherein the optical transmission axes of the reflective polarizer and the absorptive polarizer are substantially parallel.

10. A glazing structure as defined in claim 9, wherein the reflective polarizer and the absorptive polarizer are circular polarizers.

11. A glazing structure as defined in claim 1, wherein the glazing structure is part of a window of a building, and wherein the first side of the optically active layer faces the exterior of the building.

12. A glazing structure as defined in claim 1, wherein the first polarization layer and the second polarization layer are each linear polarizers.

13. A glazing structure as defined in claim 1, wherein the first polarization layer reflects light of the second polarization orientation that first enters the glazing structure from the second side and absorbs light of the second polarization orientation that first enters the glazing structure from the first side.

14. A glazing structure, comprising:
  a substrate; and
  means associated with the substrate for selectably controlling the amount of light transmitted through the glazing structure and the amount of light reflected by the glazing structure to place the glazing structure into a plurality of optical states, the means including at least one reflective polarizer and at least one absorptive polarizer;
  wherein the means controls the transmission and reflection of light at wavelengths across the entire infrared and visible light spectrum; and
  wherein the means controls the amount of transmission and reflection with the selective application of electrical signals and without movement of mechanical components, and wherein the selective application of electrical signals is operable to make the glazing structure transmissive and substantially non-reflective of light in at least one of the plurality of optical states,
  wherein the glazing structure is part of a window of a building, and wherein the glazing structure is substantially non-reflective to light that is incident upon a side of the glazing structure that faces the exterior of the building.

15. A method for controlling the amount of light transmitted through and reflected by a glazing structure, the method comprising:
  providing a substrate with multiple layers applied thereto, wherein the multiple layers include an optically active layer, a reflective polarizer layer, and an absorptive polarizer layer; and
  applying an electrical signal to the optically active layer to change the amount of light transmitted through the glazing structure to place the glazing structure into one of a plurality of optical states, wherein the transmission of light at wavelengths across the entire visible and infrared light spectrum is changed, and wherein the applying of an electrical signal is operable to make the glazing structure transmissive and substantially non-reflective of light in at least one of the plurality of optical states,
  wherein the glazing structure is part of a window of a building, and wherein the reflective polarizer layer is disposed on a side of the optically active layer that faces the exterior of the building.

* * * * *